March 16, 1954 H. E. VAN HOESEN 2,672,208
ELECTRICAL PRECIPITATION
Filed April 3, 1951 2 Sheets-Sheet 1
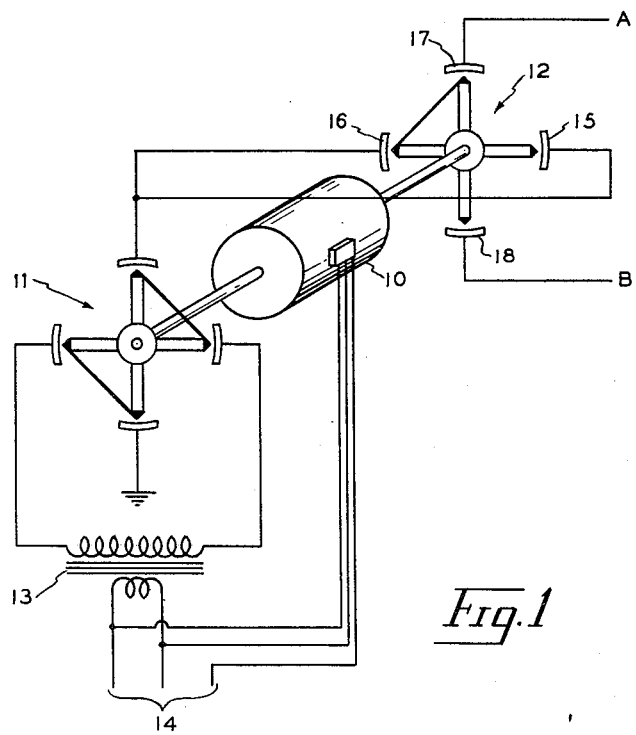
Fig.1
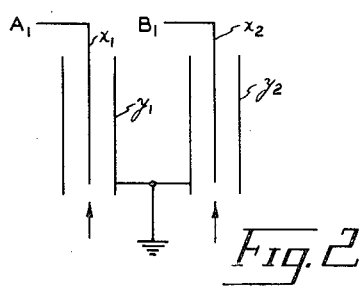
Fig.2
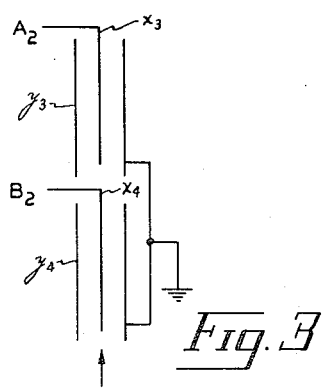
Fig.3
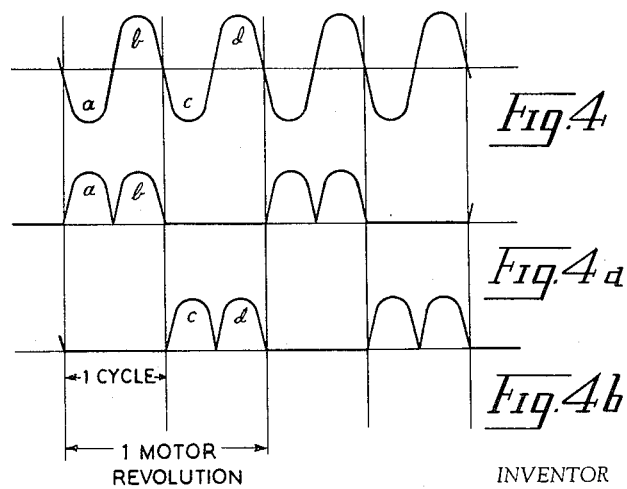
Fig.4
Fig.4a
Fig.4b
INVENTOR
HAROLD E. VAN HOESEN March 16, 1954 H. E. VAN HOESEN 2,672,208
ELECTRICAL PRECIPITATION
Filed April 3, 1951 2 Sheets-Sheet 2
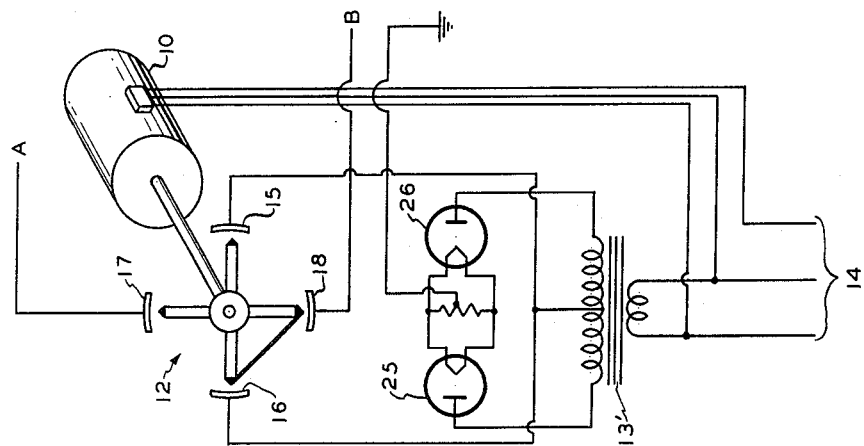
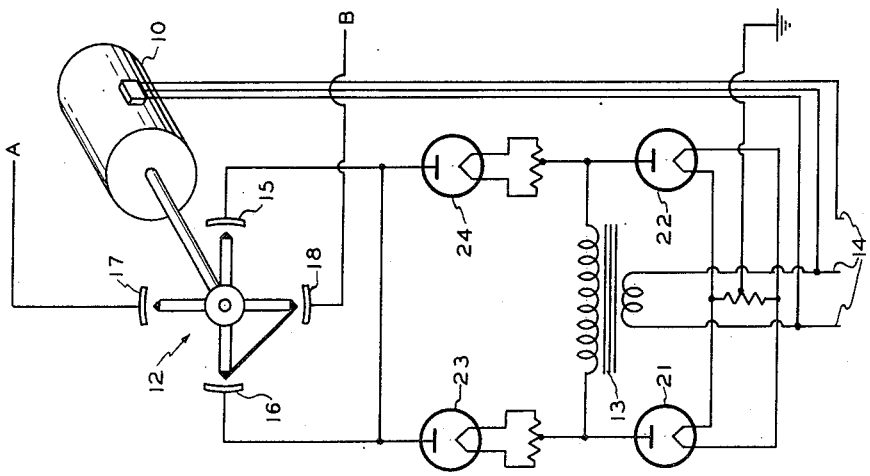
INVENTOR
HAROLD E. VAN HOESEN
BY *Stowell & Evans*
ATTORNEYS Patented Mar. 16, 1954

2,672,208

UNITED STATES PATENT OFFICE 2,672,208

ELECTRICAL PRECIPITATION

Harold E. Van Hoesen, Somerville, N. J., assignor to Research Corporation, New York, N. Y., a corporation of New York Application April 3, 1951, Serial No. 218,988

7 Claims. (Cl. 183—7)

This invention relates to the electrical treatment of gases and more particularly it is directed to apparatus for the electrical precipitation of suspended particles from gases.

It has been found that substantial advantages in the operation of electrical precipitators of the Cottrell type can be obtained by energizing a plurality of electrical precipitator units from a source of alternating current in such a manner that the units are successively energized with a full cycle of the alternating current source at the same polarity throughout the cycle with a break of one or more cycles between the periods of energization of each unit.

One of the advantages of this mode of energization is that the periods of no energization are long enough to permit a substantially complete leakage of potential from the collected material between periods of energization, thereby preventing the building up of electrical charges which would interfere with effective precipitation by reducing normal corona discharge and causing arcing. This is effected by the apparatus of the invention while maintaining balanced electrical operation and full utilization of the power supply.

The principles of the invention will be particularly illustrated with reference to the energization of two precipitator units, as shown in the accompanying drawings in which Fig. 1 is a diagrammatic representation of a system for energizing two precipitator units in alternation with full cycles of an alternating current source at constant polarity;

Figs. 2 and 3 are diagrammatic representations of parallel and series arrangements, respectively, of two precipitator units in connection with the energizing system of the invention;

Figs. 4, 4a and 4b are graphs showing the general form of voltage input and outputs of the system of Fig. 1; and Figs. 5 and 6 are diagrammatic representations of modifications of the energizing system of the invention, utilizing thermionic tubes.

The energizing system of Fig. 1 comprises a synchronous motor 10 driving two rotary switches 11 and 12, and a step-up transformer 13. The alternating current power source 14 is connected to the primary of the transformer and also actuates the synchronous motor at a speed of one revolution in each two cycles of the alternating current power supply. Switch 11 alternately connects one pole and the other of the secondary of transformer 13 during successive half-cycles to the input shoes 15 and 16 of switch 12, and switch 12 connects the input shoes 15, 16 successively to output shoes 17 during two successive half cycles and then to output shoe 18 during the two succeeding half cycles. Conductors A and B connect shoes 17 and 18 to the respective discharge electrode assemblies $A_1$, $B_1$ of parallel treater units (Fig. 2) or $A_2$, $B_2$ of serially arranged treater units (Fig. 3).

In Figs. 2 and 3, the discharge electrode assemblies of the treater units are diagrammatically indicated at X1, X2, X3, X4, and the collecting electrode assemblies at Y1, Y2, Y3, Y4. The direction of gas flow through the treater units is indicated by arrows.

The voltage relationships are shown in Figs. 4, 4a and 4b. Fig. 4 shows the voltage wave form of the high tension alternating current supplied by transformer 13; Fig. 4a shows the voltage wave form at terminal A of the system of Fig. 1; and Fig. 4b shows the voltage wave form at terminal B of Fig. 1. It will be seen that each treater unit is energized throughout a cycle of the supply current at a constant polarity and is then disconnected during the succeeding cycle during which the companion treater unit is likewise energized.

Electronic switch means may be used in place of rotary switches. Two arrangements utilizing thermionic tubes are shown in Figs. 5 and 6, in which elements corresponding to elements of Fig. 1 are given the same numbers.

In Fig. 5, the bridge circuit comprising thermionic tubes 21, 22, 23, 24 and indicated connections passes rectified high potential pulses from the secondary of transformer 13 to input shoes 15, 16 of rotary switch 12.

In Fig. 6, two thermionic tubes 25, 26 are connected to the secondary of center tapped transformer $13^1$ to produce rectified high potential pulses at input shoes 15, 16 of rotary switch 12.

In both Figs. 5 and 6, rotary switch 12 passes two successive half cycle pulses of the same polarity alternately to conductors A and B.

It will be seen that the invention provides apparatus for the electrical treatment of gases in a pair of treater units each having opposed electrodes, comprising a transformer having its low voltage winding connected to a source of alternating current, and circuit elements connecting the electrodes of the treater units to the high voltage winding of the transformer, said circuit elements including synchronous energy-directing devices connecting the opposed electrodes of one of treater units across spaced terminals of the high voltage winding of the transformer through two successive half cycles of the alternating current and simultaneously disconnecting at least one of the opposed electrodes of the other treating unit from the high voltage winding of the transformer through the two successive half cycles whereby to supply to each of the treater units in alternation a full cycle of current at the same polarity throughout the cycle.

I claim:

1. Apparatus for the electrical treatment of gases in a pair of treater units each having opposed electrodes, comprising a transformer having its low voltage winding connected to a source of alternating current, and circuit elements connecting the electrodes of the treater units to the high voltage winding of the transformer, said circuit elements including synchronous energy-directing and rectifying devices connecting the opposed electrodes of one of the treater units across spaced terminals of the high voltage winding of the transformer through two successive rectified half cycles of the alternating current at the same polarity and simultaneously disconnecting at least one of the opposed electrodes of the other treating unit from the high voltage winding of the transformer through the two successive half cycles whereby to supply to each of the treater units in alternation a full cycle of current at the same polarity throughout the cycle.

2. Apparatus for the electrical treatment of gases in a pair of treater units each having opposed electrodes, comprising a transformer having its low voltage winding connected to a source of alternating current, and circuit elements connecting the electrodes of the treater units to the high voltage winding of the transformer, said circuit elements including a rotary switch having output terminals spaced 180° apart and connected one to an electrode of each treater unit, input terminals intermediate said output terminals, and a rotary quadrant connector element, synchronous motor means rotating said quadrant connector at a speed of one revolution in two cycles of the alternating current supply, and full wave rectifier means connecting said input terminals in common across spaced terminals of the high voltage winding of the transformer, whereby to supply to each of the treater units in alternation a full cycle of current at the same polarity throughout the cycle.

3. Apparatus for the electrical treatment of gases in a pair of treater units each having opposed electrodes, comprising a transformer having its low voltage winding connected to a source of alternating current, and circuit elements connecting the electrodes of the treater units to the high voltage winding of the transformer, said circuit elements including a rotary switch having output terminals spaced 180° apart and connected one to an electrode of each treater unit, input terminals intermediate said output terminals, and a rotary quadrant connector element, synchronous motor means rotating said quadrant connector at a speed of one revolution in two cycles of the alternating current supply, and rotary switch full wave rectifier means connecting said input terminals in common across spaced terminals of the high voltage winding of the transformer, whereby to supply to each of the treater units in alternation a full cycle of current at the same polarity throughout the cycle.

4. Apparatus for the electrical treatment of gases in a pair of treater units each having opposed electrodes, comprising a transformer having its low voltage winding connected to a source of alternating current, and circuit elements connecting the electrodes of the treater units to the high voltage winding of the transformer, said circuit elements including a rotary switch having output terminals spaced 180° apart and connected one to an electrode of each treater unit, input terminals intermediate said output terminals, and a rotary quadrant connector element, synchronous motor means rotating said quadrant connector at a speed of one revolution in two cycles of the alternating current supply, and thermionic tube full wave rectifier means connecting said input terminals in common across spaced terminals of the high voltage winding of the transformer, whereby to supply to each of the treater units in alternation a full cycle of current at the same polarity throughout the cycle.

5. Apparatus as defined in claim 3 wherein the rotary switch rectifier means is driven by said synchronous motor.

6. Apparatus for the electrical treatment of gases in a pair of treater units each such unit comprising opposed electrodes of respectively different polarity, comprising a source of voltage of a base frequency including a step-up transformer, a full-wave rectifier operatively connected to said transformer, and rectified-wave directing means comprising a director controlled by the frequency of said voltage source connecting the rectified output of said full-wave rectifier for successive full cycles of the source frequency across the opposed electrodes of said units in successive alternation, whereby said unit is energized alternately with two successive half cycles of unidirectional current of the same polarity.

7. Apparatus for the electrical treatment of gases in a pair of treater units, each such unit comprising opposed electrodes of respectively different polarity, comprising a source of voltage of a base frequency including a step-up transformer, and energy directing means comprising a rotary quadrant connector element revolving at half synchronous speed and four cooperating shoes spaced at 90 mechanical degrees, thereby corresponding to 180 electrical degrees, two diametrically spaced shoes connected to the rectifier means and the other two to respective electrodes of the treater units.

HAROLD E. VAN HOESEN.

References Cited in the file of this patent

UNITED STATES PATENTS

| Number | Name | Date |
|---|---|---|
| 2,000,654 | Wintermute | May 7, 1935 |
| 2,069,692 | Wintermute | Feb. 2, 1937 |

FOREIGN PATENTS

| Number | Country | Date |
|---|---|---|
| 456,405 | Germany | Feb. 24, 1928 |
| 657,376 | Germany | Mar. 3, 1938 |